United States Patent [19]

Reinicke

[11] Patent Number: 5,375,811
[45] Date of Patent: Dec. 27, 1994

[54] MAGNETIC-LATCHING VALVE

[75] Inventor: Robert H. Reinicke, Mission Viejo, Calif.

[73] Assignee: Marotta Scientific Controls, Inc., Montville, N.J.

[21] Appl. No.: 184,484

[22] Filed: Jan. 19, 1994

[51] Int. Cl.⁵ .................................................. F16K 31/08
[52] U.S. Cl. .................................. 251/129.16; 251/65; 251/129.21; 137/550
[58] Field of Search ............... 251/129.16, 65, 129.21; 137/550

[56] References Cited

U.S. PATENT DOCUMENTS

| 3,383,084 | 5/1968 | Mayfield | 251/129.16 X |
| 3,814,376 | 6/1974 | Reinicke | 251/65 |
| 3,977,436 | 8/1976 | Larner | 251/65 X |
| 5,174,336 | 12/1992 | Casey et al. | 137/550 |

Primary Examiner—Arnold Rosenthal
Attorney, Agent, or Firm—Hopgood, Calimafde, Kalil & Judlowe

[57] ABSTRACT

A magnetic-latching of either of the selected operating positions of a two-position valve utilizes a generally toroidal magnetic circuit that is established by spaced inner and outer annular walls which are connected at their axial ends, with an inlet-port fluid-flow connection at one end to the interior of the inner wall, and with an outlet-port fluid-flow connection from the interior of the inner wall. The inner wall has a gap between axially spaced first and second annular pole faces. A single electrical excitation coil is coupled to the magnet circuit at overlap with the inner annular wall on one side of the gap. A disc-shaped armature is compliantly supported for axially shuttled displacement in the gap in alternating abutment with one to the exclusion of the other of the pole faces. Fixedly mounted radially polarized means within the outer annular wall completes a magnet circuit to the outer wall via the periphery of the armature and one or the other of the pole faces, depending upon the shuttled position of the armature. And valve means for on/off control of port-to-port flow is provided by an annular valve seat radially within one of the pole faces, in coaction with a valve member carried by the armature.

18 Claims, 2 Drawing Sheets

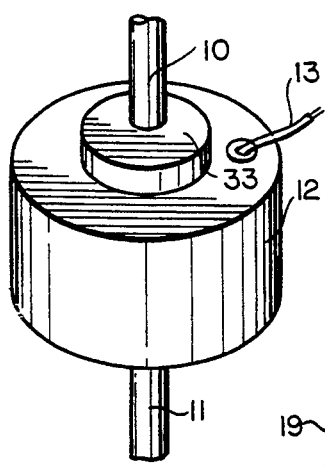
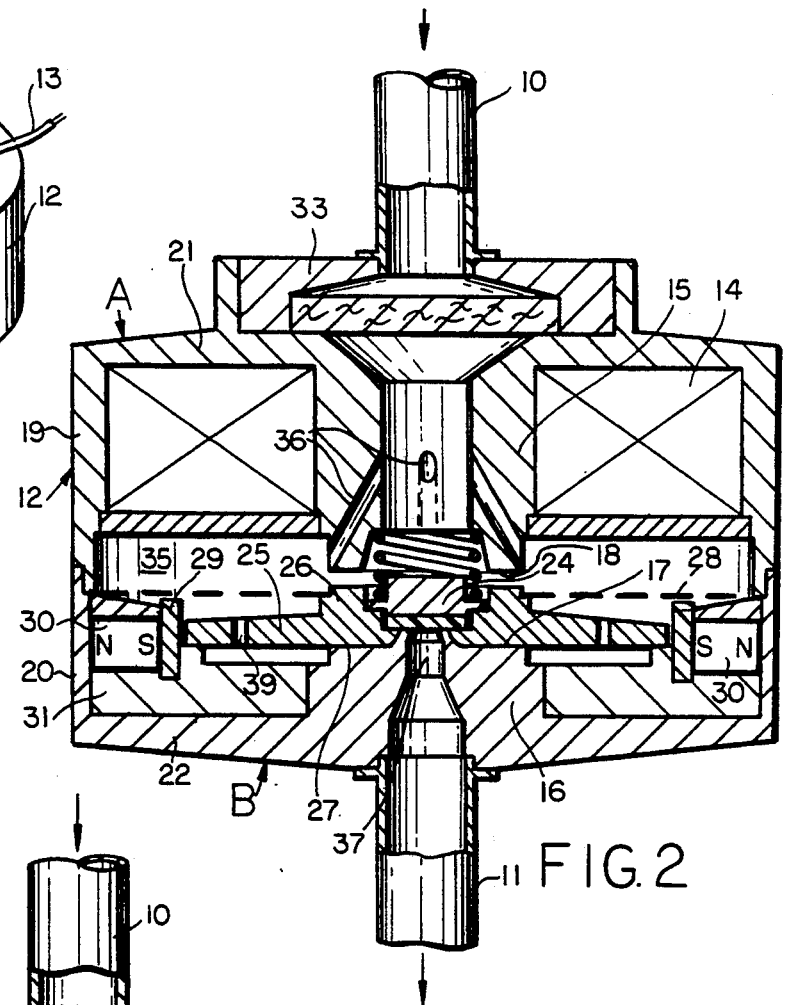
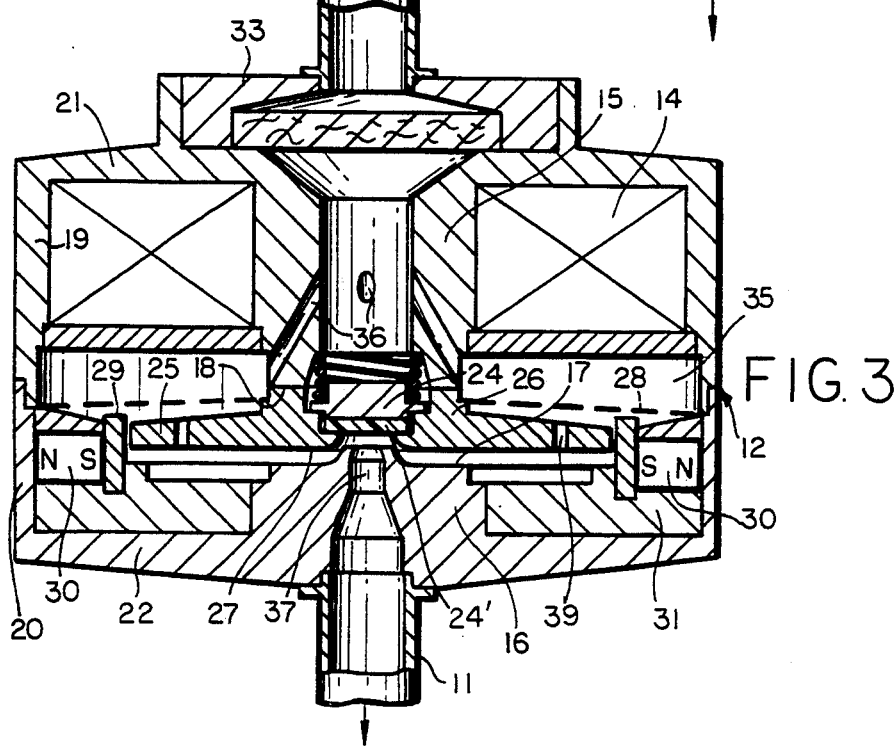

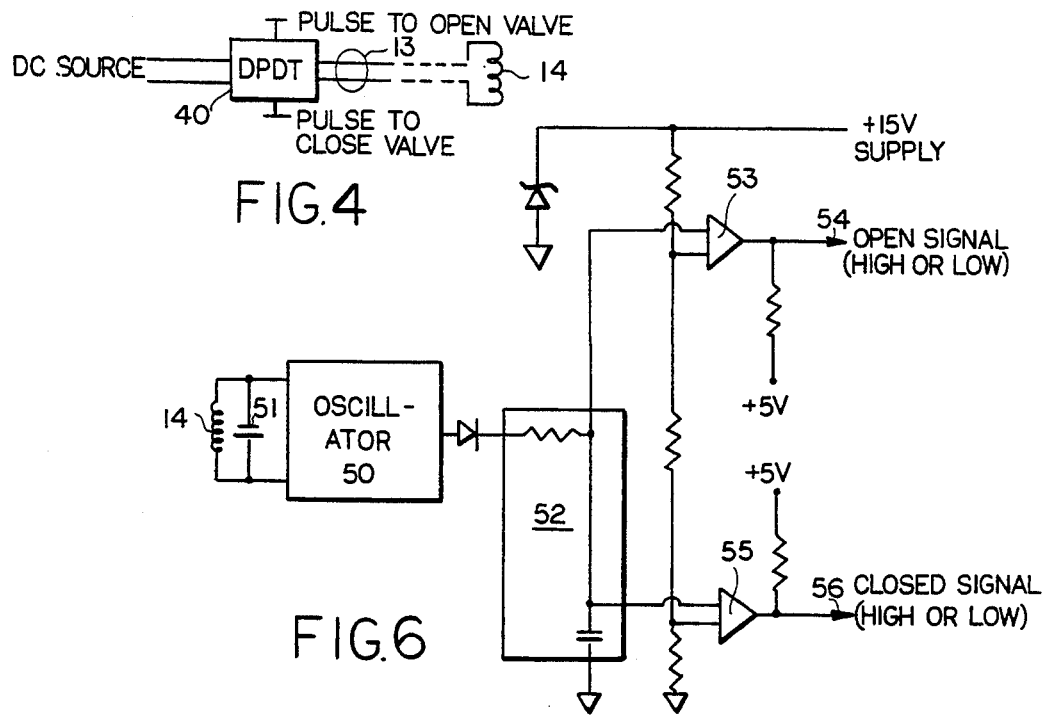
FIG.4
FIG.6
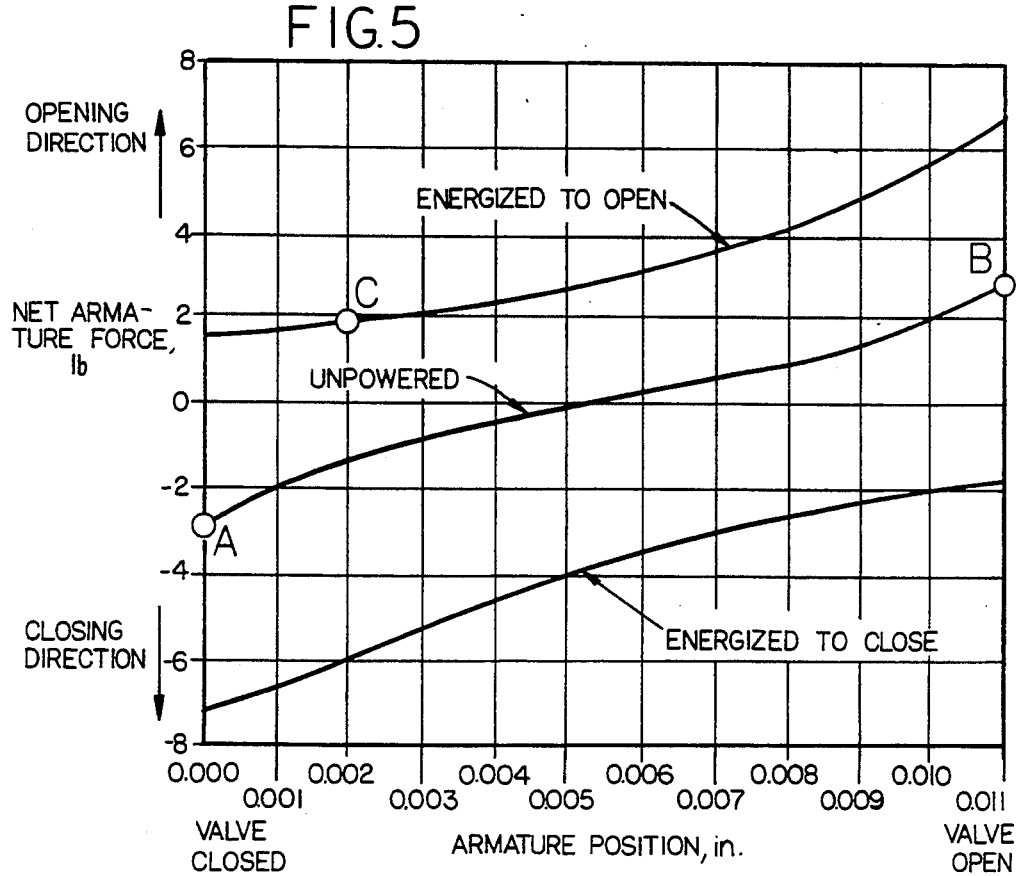
FIG.5

MAGNETIC-LATCHING VALVE

BACKGROUND OF THE INVENTION

The invention relates to an electromagnetically operated valve construction wherein permanent-magnet action is effective to latch, i.e., to retain, a selected open or closed condition of the valve.

U.S. Pat. No. 3,814,376 describes a magnetically operated two-position latching valve having an armature that also serves as a movable valve element, with valve action, and inlet and outlet flow connections, all at one axial end of the construction. The armature is movable to its two positions by and is latched in one or the other of its two positions solely by magnetic flux. An elongate armature is actuated from one to the other of its positions by excitation of two solenoid coils in a first polarity relationship, and return from said other to said one position is effected by excitation of the two solenoid coils in a second or reversed polarity relationship. The armature is a relatively massive cylinder which is guided in an elongate bore; it is therefore subject to friction which can become a source of unreliable operation, in the event of grit or other particles which may be borne by fluid controlled by valve action. The mass of the armature also makes the construction vulnerable to an inertial response to mechanical shock, wherein an unwanted open-valve condition is an inadvertent occurrence, or wherein an open-valve condition is inadvertently shut down.

BRIEF STATEMENT OF THE INVENTION

It is an object of the invention to provide an improved electromagnetically operated magnetically-latching valve construction, avoiding difficulties of prior-art devices.

It is a specific object to achieve the above object with substantially reduced susceptibility to false, i.e., unwanted, operation.

Another specific object is to achieve the above objects with a construction that lends itself to miniaturizing.

Still another specific object is to meet the above objects with a construction in which friction is reduced to virtually an absolute minimum.

The preferred embodiment of the invention achieves the foregoing objects and offers further features in a construction in which a generally toroidal magnetic circuit is established by spaced inner and outer annular walls which are connected at their axial ends, with an inlet-port fluid-flow connection at one end to the interior of the inner wall, and with an outlet-port fluid-flow connection from the interior of the inner wall. The inner wall has a gap between axially spaced first and second annular pole faces. A single electrical excitation coil is coupled to the magnet circuit at overlap with the inner annular wall on one side of the gap. A disc-shaped armature is compliantly supported for axially shuttled displacement in the gap in alternating abutment with one to the exclusion of the other of the pole faces. Fixedly mounted radially polarized means within the outer annular wall completes a magnet circuit to the outer wall via the periphery of the armature and one or the other of the pole faces, depending upon the shuttled position of the armature. And valve means for on/off control of port-to-port flow is provided by an annular valve seat radially within one of the pole faces, in coaction with a valve member carried by the armature.

BRIEF DESCRIPTION OF THE DRAWINGS

The invention will be described in detail for a preferred embodiment, in conjunction with the accompanying drawings, in which:

Fig. 1 is a perspective view of a complete, self-contained valve of the invention;

FIG. 2 is an enlarged vertical section of the valve of FIG. 1, shown for the closed condition of the valve;

FIG. 3 is a view similar to FIG. 2, for the open condition of the valve;

FIG. 4 is a simplified diagram schematically showing electrical circuitry for operation of the valve;

FIG. 5 is a graph depicting armature force as a function of armature position, for the valve of FIGS. 1 to 3; and FIG. 6 is an electrical diagram schematically showing monitoring circuitry for remotely deriving a signal indicative of the instantaneous open or closed condition of the valve.

DETAILED DESCRIPTION

The magnetic-latch valve of the presently preferred embodiment of the invention has an external appearance as in FIG. 1, wherein inlet and outlet fluid-flow connections 10, 11 are made to opposite axial ends of a cylindrical housing 12, with provision for electrical actuation via a flexible cable connection 13 to an electrical coil or winding 14 (FIG. 2) contained within housing 12.

In FIG. 2, the valve housing of FIG. 1 is seen to comprise fixed magnetic circuitry of generally toroidal configuration, comprising radially inner and outer walls of magnetic-flux-conducting material, completed by annular end connections of these walls, the excitation coil 14 being shown coupled to the upper portion 15 of the inner wall of the magnetic circuit. More specifically, the magnetic circuit is shown to comprise two telescopically fitted generally annular cup-shaped parts A, B, each of which has an inner annular wall portion, as in the case of wall portion 15 of the upper part A; the inner-wall portion 16 of the lower part B extends upwardly to an annular pole face 17 in axially spaced confronting relation with an annular pole face 18 of the inner-wall portion 15, thereby establishing an inner wall gap between these pole faces 17, 18.

The outer annular wall of the fixed generally toroidal magnetic circuitry thus comprises the annular skirt portion 19 of upper part A in fitted relation to the skirt portion 20 of lower part B; the annular axial-end connections between inner and outer annular wall portions are completed by the annular cup connection 21 of upper part A and by the annular cup connection 22 of lower part B.

A disc-shaped armature 25 carries a valve member 24 (to be later described) and is axially compliantly mounted in the gap between pole faces 17, 18, for shuttled displaceability between limiting points of contact with these pole faces. Armature 25 has a reduced annular hub portion 26 for annular-area contact with pole face 18 when in its "up" position (see FIG. 3) and a flat underside 27 for annular-area contact with pole face 17 when in its "down" position (see FIG. 2). Axially compliant suspension and central positioning of armature 25 are provided by a fenestrated diaphragm element 28 which will be understood to be generally circular, with an outer rim deriving stable retention in the bore of outer annular wall portion 20, with an inner rim deriving stable retention at a shoulder formation in armature hub 26, and with integrally formed flexible, preferably somewhat helically arcuate, leg connections between these inner and outer rims.

The periphery of armature 25 is cylindrical and in relatively close radial clearance with the cylindrical bore of an annular ring 29 which is fixedly supported at radially inward offset from the outer wall portion 20, and plural angularly spaced permanently magnetized elements 30, within the radial offset of ring 29 from outer wall 20, establish the inner cylindrical surface of ring 29 as a cylindrical pole face that is permanently polarized to a polarity (here shown as "S" for South) opposite the polarity of the outer wall 20 (here shown as "N" for North). The axial extent of ring 29 is such as to fully lap the periphery of armature 25 whether the latter is in its "up" position (FIG. 2) or in its "down" position (FIG. 3).

In FIGS. 2 and 3, a suitably formed annular block 31 of magnetically neutral material, such as stainless steel, aluminum or molded plastic fills the "bottom" of the annular cup of part B, providing locating retention of ring 29 and radial bores for reception and location of cylindrical permanent-magnet elements 30. The block 31 also contributes to the locating support of the outer rim of the axially compliant element 28.

From magnetic circuitry thus far described, it will be understood that, for the "down" position of FIG. 2, a permanently polarized circuit from the "S" pole of magnets 30 is completed across the clearance from ring 29 to armature 25, downward from armature 25 via pole face 17 to the inner annular portion 16 of the lower part B, thence radially outward via annular closure 22 and upward in outer wall portion 20 to the "N" pole of magnets 30. In contrast, for the "up" position of FIG. 3, a different permanently polarized circuit from the "S" pole of magnets 30 is completed across the clearance from ring 29 to armature 25 via pole face 18 to the inner annular portion 15 of upper part B, thence radially outward via annular closure 21 and downward in outer wall portions 19, 20 to the "N" pole of magnets 30.

Directing attention now to the provision for fluid flow vel non between inlet and outlet port connections 10, 11, it is noted that the inlet port is at a cap formation 33 which establishes an enlarged cavity for containment of filtering means 34 to screen particulates from passage with fluid flow through the valve. For certain usages, it will be desirable to have cap formation 33 removably secured to end closure 21, but in the form shown cap 33 (and its retained filtering means 34) is permanently secured to closure 21. Filtered fluid passing to the interior of inner-wall portion 15 is at all times communicated to a relatively large volumetric space 35 radially between the inner and outer wall portions and axially between coil 14 and armature 25. And plural angularly spaced inclined passages 36 by-pass the region of pole-face 18 engageability, to assure that the "up" position of FIG. 3 shall not affect this communication.

For on/off flow control, valve member 24 has a normally seated "down" position against a shoulder in the bore of armature 25 and the bottom face of valve member 24 preferably is coated with or otherwise carries a lining 24' of elastomeric material, such as polytetrafluoroethylene, for low-friction coaction with an annular valve-seat formation at the upper end of the central or outlet-port passage 37 of inner-wall portion 16. Resilient means 38 is shown continuously urging valve member 24 in the direction of seating reference to armature 25, but the valve seat formation of inner-wall portion 16 is preferably so poised with respect to the armature-seated position of valve member 24, that closure of the valve by coating 24' engagement to the valve-seat formation occurs just prior to armature engagement to the fixed lower pole face 17.

In the valve-closed condition depicted in FIG. 2, filtered pressure fluid awaiting passage through the valve is trapped by sealed closure of valve member 24, 24' against the valve seat. And when the valve has been actuated to open condition (FIG. 3), filtered pressure fluid is immediately available for passage through tile radial clearance between armature 25 and ring 29, as well as by a series of angularly spaced apertures 39 in the disc portion of armature 25.

Actuation of the described valve requires only the transient supply of an actuating pulse of electric energy to the single coil 14, of one polarity to shift armature 25 from the magnetically latched "down" or valve-closed position of FIG. 2 to the magnetically latched "up" or valve-open position of FIG. 3. A similar transient excitation pulse of opposite polarity will shift armature 25 from the "up"-latched or valve-open position of FIG. 3 to the "down"-latched or valve-closed position of FIG. 2. FIG. 4 is a schematic suggestion of circuit means for such excitation of coil 14, on a selective manually operated basis, via push-button actuated polarity reversing double-pole double-throw (DPDT) means 40, but it will be understood that the means of dictating when and in what polarity to deliver given valve-opening and valve-closing pulses may be computer or otherwise driven, depending upon particular applications of the invention.

FIG. 5 is a graphical display from which to quantitatively appreciate relative magnetically derived forces at work in operation of the described magnetically latch valve. Numerical data in FIG. 5 are applicable to the following illustrative data for a relatively miniaturized valve structure, of 1.25-inch maximum diameter and 0.75-inch axial length at such diameter, serving a line size of 3.2-mm diameter at 10, 11:

applied voltage pulse, 24 to 32 volts d-c, for 100 ms duration
cable 13, two-wire reversing polarity
position indication, electronic, for closed position (FIG. 2), via external electronics
weight, about 0.075 Kg (0.17 lb.), of which 0.07 lb. (about 0.0032 Kg) is attributable to armature 25).

The graph of FIG. 5 depicts actuator force (net armature force) in pounds, as a function 0.001-inch increments in a total axial displacement of armature 25 to the extent of 0.011 inch, wherein "plus" force acts to open the valve, and "minus" force acts to close the valve, and wherein the abscissa is the actuator stroke, with the armature magnetically latched to the "close" pole 27 at a stroke of 0.000 inch. The three curves of FIG. 5 will be discussed sequentially beginning with Curve 1, bearing the legend "Coil Energized to Open".

Curve 1 in FIG. 5 depicts the net (open pole minus close pole) actuator magnetic force when coil 14 is energized with a +24 v. d-c square pulse of 100 ms duration. The force at 0.002-inch displacement (the point marked c) which is the worst case in the valve-opening design-point stroke, is +1.9 lbs., well in excess of the force required to open the valve, and this "Coil Energized to Open" actuator force increases to +6.7 lbs. at the valve full-open displacement position, 0.011 inch.

Curve 2 in FIG. 5 depicts the net magnetic force attributable only to the above-described permanently polarized circumstances, i.e., with no power supplied to actuator coil 14. This curve is useful in determining the end-position magnetic forces available to keep the valve latched in one or the other of its open (FIG. 3) and closed (FIG. 2) positions. Note that the latching force in the fully closed position (0.000 inch, the point marked A) is −2.9 lbs., and that as armature 25 is moved in the opening direction, the closing force drops off, reaching zero at midstroke (0.0055 inch), and that it then reverses direction to reach +2.8 lbs. latching force at the full-open position (0.011 inch the point marked B).

Curve 3 in FIG. 5 is analogous to Curve 1, to show that, when similarly excited with a pulse of opposite polarity, namely, a −24 v.d-c square pulse of 100 ms duration, coil 14 develops a net magnetic force of −1.8 lbs. to initiate a valve-closing displacement, again well in excess of the force needed for this direction of armature displacement to close the valve.

As noted above, the de-energized, fully closed magnetic-latch force is −2.1 lbs., and the weight of armature 25 is 0.007 lb. Thus, the armature will stay latched at acceleration levels up to 414 gs (i.e., 2.9/0.007). An illustrative launch-vehicle design criterion of 20 g's (rms) random vibration imposes 60-g peaks (i.e., 3 sigma), and therefore the valve stays tightly latched during launch vibration, with a high margin of safety.

As a further feature of the invention, FIG. 6 illustrates an external electronic circuit whereby to derive and indicate the magnetically latched position of armature 25 (and, hence, the open or closed condition of the valve) by sensing inductance change in coil 14 as the change occurs when the valve changes position. Following d-c excitation of coil 14 to actuate the valve from latched-closed to latched-open condition, the energizing current is removed. An a-c signal from an oscillator 50 is applied to coil 14 but at a power level much too low and at a frequency much too high to actuate the valve. An LC circuit, comprising a capacitor 51, with coil 14 serving as the inductor, is designed to resonate at the slightly reduced coil inductance seen in the valve-open position, so that the output of the tuned circuit is large. The tuned circuit output is rectified and integrated at 52, and the output of such processing is monitored by a comparator circuit 53 which generates a "valve-open" output logic signal at 54.

After the valve is commanded back to the latched-closed state and the d-c energizing current is removed, the low-level a-c signal is reapplied to the valve coil 14. The increased coil inductance seen in the closed position reduces the output of the LC circuit since its frequency has changed and the LC circuit is no longer in resonance. This circumstance causes an inverting comparator circuit 55 to generate a "valve-closed" output logic signal at 56.

The described magnetic-latching valve of the invention will be seen to have achieved all stated objects. In particular:

1. The valve involves no sliding fit operation;
2. External electronic derivation of valve position, without requiring any switching or mechanical detection;
3. Inherently simpler and less costly construction than heretofore; and
4. Superior inherent performance capabilities.

What is claimed is:

1. A magnetic-latch valve comprising a generally toroidal magnetic circuit having radially spaced inner and outer annular walls that are connected at their axial ends, an inlet-port connection to the interior of said inner wall at one of said axial ends, an outlet-port connection to the interior of said inner wall at the other of said axial ends, said inner annular wall having a gap between axially spaced first and second annular pole faces, an electrical excitation coil coupled to said inner annular wall on one axial side of said gap, a disc-shaped armature compliantly supported for axially shuttled displacement in said gap in alternating abutment with one to the exclusion of the other of said pole faces, said disc-shaped armature having an outer circumferentially continuous pole-face surface; permanently polarized radially polarizing means carried by and within said outer annular wall in radially spaced confronting relation with the pole-face surface of said armature throughout the range of axially shuttled displacement of said armature for completing a magnetic circuit to said outer annular wall via one or the other of said pole faces depending upon the shuttled position of said armature; and valve means for on/off control of port-to-port flow, comprising an annular valve seal radially within one of said pole faces, and a valve member carried by said armature with valve-closed relation to said seat at one shuttled position and with a valve-opened relation to said seat at the other shuttled position.

2. The magnetic-latch valve of claim 1, in which said radially polarizing means is fixedly mounted with respect to said outer annular wall.

3. A magnetic-latch valve comprising a generally toroidal magnetic circuit having radially spaced inner and outer annular walls that are connected at their axial ends, an inlet-port connection to the interior of said inner wall at one of said axial ends, an outlet-port connection to the interior of said inner wall at the other of said axial ends, said inner annular wall having a gap between axially spaced first and second annular pole faces, an electrical excitation coil coupled to said inner annular wall on one axial side of said gap, a disc-shaped armature compliantly supported for axially shuttled displacement in said gap in alternating abutment with one to the exclusion of the other of said pole faces; means including said disc-shaped armature and radially polarizing means for completing a magnetic circuit to said outer annular wall via one or the other of said pole faces depending upon the shuttled position of said armature; said radially polarizing means comprising an angularly spaced plurality of polarized magnetic elements; and valve means for on/off control of port-to-port flow, comprising an annular valve seat radially within one of said pole faces, and a valve member carried by said armature with valve-closed relation to said seat at one shuttled position and with a valve-opened relation to said seat at the other shuttled position.

4. The magnetic-latch valve of claim 3, in which said polarized magnetic elements are fixedly mounted with respect to said outer annular wall.

5. The magnetic-latch valve of claim 3, in which an annular member of magnetic-flux-conducting material is fixedly mounted with respect to said outer annular wall, with like first-polarity magnetic-element contact with said outer annular wall and with opposite polarity magnetic-element contact with said annular member, said armature having a periphery that is in radial-clearance relation with said annular member throughout the range of shuttled displaceability of said armature.

6. The magnetic-latch valve of claim 1, in which said valve member has a valve-closure face of low-friction elastomeric material.

7. The magnetic-latch valve of claim 6, in which said low-friction elastomeric material is polytetrafluoroethylene.

8. The magnetic-latch valve of claim 1, in which said valve member is axially displaceably carried by said armature, and means resiliently and axially urging said valve member to a seating position within said armature, such that for the armature-shuttled position of valve closure, said valve member is relieved of its armature-seated position against compliant action of said resilient means.

9. The magnetic-latch valve of claim 1, in which the compliant support of said armature is provided by an axially compliant annular member having its outer limit axially retained at said outer annular wall and its inner limit axially retained by said armature.

10. The magnetic-latch valve of claim 9, in which said armature has a reduced-radius annular hub sized for coaction with one of said pole faces, and in which the inner limit of said axially compliant annular member is axially retained at said annular hub.

11. The magnetic-latch valve of claim 1, in which that portion of said inner wall which is axially spaced away from said valve seat has at least one passage for fluid flow in by-passing relation to the pole face of said portion of said inner wall.

12. The magnetic-latch valve of claim 11, in which said passage is one of an angularly spaced plurality of like passages.

13. The magnetic-latch valve of claim 1, in which control means connected to said excitation coil is selectively operable to supply a transient pulse of sufficient energy and first plurality to dislodge said armature from magnetically latched relation to one of said pole faces and into magnetically latched relation to the other of said pole faces, and to supply a transient pulse of sufficient energy and second plurality to dislodge said armature from magnetically latched relation to said other pole face and into magnetically latched relation to said one pole face.

14. The magnetic-latch valve of claim 1, wherein filter means is provided in said connection from the inlet port to the interior of said inner wall.

15. A magnetic-latch valve comprising a generally toroidal magnetic circuit of magnetic-flux-conducting material wherein a radially outer annulus surrounds a radially inner annulus and is completed by axial-end closures, with a fluid-flow inlet-port connection through one of said end closures and with a fluid-outlet port connection through the other of said end closures, said inner annulus having an axial gap between a first inner-annulus portion connected to one end closure and a second inner-annulus portion connected to the other end closure, said first inner-annulus portion having an annular pole-face formation in gap-spaced relation to an annular pole-face formation of said second inner-annulus portion, and said second inner-annulus portion having an annular valve seat in axially spaced confrontation of said first inner-annulus portion; a disc-shaped armature of magnetic-flux-conducting material interposed between said first and second inner-annulus portions, said armature being compliantly supported for axially shuttled displaceability between limits alternatingly determined by pole-face contact at said inner-annulus portions, a valve member carried by said armature and having valve-closed relation with said valve seat at one of said limits of armature displaceability and valve-open relation with said valve seat at the other of said limits of armature displaceability, a permanently radially polarized annulus surrounding and in clearance relation with said armature throughout shuttled displaceability thereof, said polarized annulus being in fixed adjacency to said radially outer annulus; and means including an electric coil contained within said radially outer annulus and in inductively coupled relation to one of said inner-annulus portions for selectively exciting said coil with a pulse of first plurality to effect one direction of armature displacement and with a pulse of opposite polarity to effect the opposite direction of armature displacement.

16. The magnetic-latch valve of claim 15, wherein filter means adjacent said inlet port connection is provided for fluid flow within said valve.

17. A magnetic-latch valve comprising a generally toroidal magnetic circuit having radially spaced inner and outer annular walls that are connected at their axial ends, an inlet-port connection to the interior of said inner wall at one of said axial ends, an outlet-port connection to the interior of said inner wall at the other of said axial ends, said inner annular wall having a gap between axially spaced first and second annular pole faces, an electrical excitation coil coupled to said inner annular wall on one axial side of said gap, a disc-shaped armature compliantly supported for axially shuttled displacement in said gap in alternating abutment with one to the exclusion of the other of said pole faces; means including said disc-shaped armature and radially polarizing means for completing a magnetic circuit to said outer annular wall via one or the other of said pole faces depending upon the shuttled position of said armature; valve means for on/off control of port-to-port flow, comprising an annular valve seat radially within one of said pole faces, and a valve member carried by said armature with valve-closed relation to said seat at one shuttled position and with a valve-opened relation to said seat at the other shuttled position; external electronic circuitry including a capacitor connected electrically across said coil and tuned to resonate as an LC circuit for one to the exclusion of other of the armature positions of said valve, and means for generating an output signal reflecting oscillation of said LC circuit as an indicator of said armature in said one position.

18. The magnetic-latch valve of claim 17, wherein said last-defined means further includes means generating another output signal of LC circuit operation at less than oscillating frequency output as an indicator of said armature in said other position.

* * * * *